Dec. 13, 1955   R. W. KING, JR   2,726,546
APPARATUS FOR MEASURING FLUID FLOW
Filed March 26, 1952   2 Sheets-Sheet 1

INVENTOR.
ROBERT W. KING, Jr.
BY Ralph C. Pastoriza
His ATTORNEY.

United States Patent Office 2,726,546
Patented Dec. 13, 1955

2,726,546

APPARATUS FOR MEASURING FLUID FLOW

Robert W. King, Jr., Bronxville, N. Y.

Application March 26, 1952, Serial No. 278,595

3 Claims. (Cl. 73—204)

This invention relates to an apparatus for measuring the flow of fluids. More particularly, it has to do with systems for providing measurements substantially instantaneously responsive to the rate of flow of fluids and to rapid fluctuations in such rate of flow.

The term "fluid" as used in the following specification is defined to include liquids, liquid vapors, and gases.

It is common practice to measure the flow of fluids by mechanical means such as vanes or propellers disposed in the path of the fluid. The degree of agitation of such mechanical means is indicative of the fluid velocity which in turn will determine through any given cross-sectional area the volume of flow per unit time. These fluid measuring systems are generally satisfactory when the fluid flow is relatively constant and involves appreciable volumes such as in large water or oil conduits or wind tunnels. However, these known mechanical devices are not well suited for measuring accurately small streams of fluids, particularly when the flow rate is apt to change or fluctuate relatively quickly. The primary difficulty is that the inertia of the mechanical components renders the response time to sudden changes in the fluid flow rate too long. Moreover, in the case of small volume flow measurements the presence of moving mechanical elements in the flow stream may adversely affect the accuracy of the measurements being made.

Other flow measuring devices include Venturi type flow meters in which pressure gradients in the direction of flow will give an indication of flow rate. The response time of these types of indicators to sudden flow changes, however, is also relatively slow due to the inertia of the fluid itself.

In an effort to overcome some of the above problems, it has been proposed to utilize a non-mechanical fluid flow indicator. For example, one system attaining some success in the case of gas flow measurements, involves exposing a constantly heated wire to the fluid flow whereby it will be cooled at a rate which is a function of the gas velocity. The resistance of the heated wire in this "hot-wire anemometer" system depends upon its temperature, and thus, changes in gas flow rate will reflect a change in resistance detectable by suitable electrical circuits. A primary difficulty with this arrangement, however, is that it will not work well in liquids because of their great heat conductivity compared to gases. Moreover, in any hot-wire anemometer, changes in the fluid ambient temperature will affect the thermal element thereby introducing errors in the final readings. These errors due to ambient temperature changes are sometimes partially compensated for by exposing a second thermally sensitive element to the ambient temperature and utilizing its response to cancel the error introduced into the first element. Such an arrangement, however, necessitates isolating the second element from the fluid stream to prevent cancellation of the desired response. This isolation delays considerably the response time of the overall system to changes in ambient temperature.

It is an object of the present invention accordingly, to provide improved apparatus for measuring fluid flow.

A further object of the invention is to provide improved systems for indicating substantially instantaneously, rapid variations in fluid flow rates.

Still further objects of the invention are to provide improved fluid flow metering apparatus involving no mechanical moving parts exposed to the fluid, having extremely rapid responses to sudden changes in flow rates, adaptable to liquids as well as gases, and designed to minimize any disturbance by the apparatus to the fluid flow under investigation.

A particular object of the invention is to provide a novel non-mechanical fluid measuring apparatus which responds substantially instantaneously to fluid flow changes and which is not appreciably affected by ambient temperature changes.

These and other objects of the invention are attained by employing, in part, the principles of the "hot-wire anemometer" type of flow indicator but providing an improvement thereover. In a preferred form of the invention, at least two thermally sensitive elements suitable for use in both liquids and gases and having electrical resistances which vary with temperature changes, are exposed to the fluid flow. The first element is maintained at a raised temperature relative to the fluid ambient temperature, while, in distinction to the prior art, the second element assumes the ambient temperature. Both elements are disposed adjacent one another such that each will be simultaneously affected by ambient temperature changes. Suitable means are provided responsive to changes in the second thermal element due to ambient temperature changes, for minimizing the effect of such changes on measurements of the rate of cooling of the first element. These measurements will then give an indication of fluid flow rate substantially independent of ambient temperature changes.

A further feature of the invention involves the use of a variable electrical resistance in series with the second thermal element. This resistance may be adjusted to such a predetermined value as to minimize further the effect of ambient temperature changes in the measuring circuit.

A better understanding of the invention will be had by referring to the accompanying drawings in which.

Figure 1:
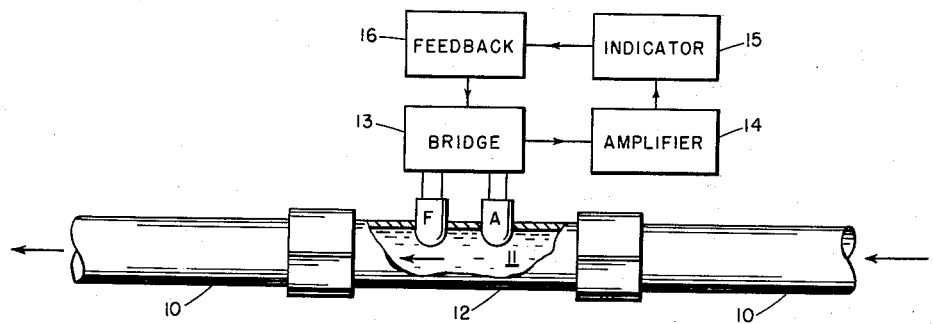
Fig. 1 is a side view partly in section showing thermal elements disposed in a fluid stream and suitable circuit elements in block form connected thereto in accordance with the invention.

Referring to Fig. 1, there is shown a conduit 10 through which a fluid 11 passes as indicated by the arrows. Interposed in the conduit 10 is one form of fluid flow measuring apparatus constructed in accordance with the present invention. As shown in the drawing, it comprises a short section of pipe or conduit 12 of known cross-sectional area, and two thermally sensitive elements F and A mounted in the upper wall thereof in such a manner as to be exposed to the fluid flow. An electrical bridge network indicated by the numeral 13 is connected to thermal elements F and A. The output of bridge 13 passes through an amplifier 14 and back to the bridge through indicator 15 and feedback circuit 16. The function of the various elements represented by the blocks 13, 14, 15, and 16 will become clear as the description proceeds.

It is to be understood that the particular conduit arrangement of Fig. 1 is merely illustrative of one application of the present invention. Thus, conduit 10 may comprise a fuel line, for example, in which case the section 12 and associated apparatus would be useful for indicating fuel consumption. Alternatively, the fluid 11 may be in the form of a vapor or gas passing through a tunnel. It is only necessary that elements F and A be mounted adjacent to each other and in the path of the fluid stream under consideration. Moreover, while these elements are illustrated as mounted one after the other in line with the direction of flow, they may be mounted in a line broadside to the flow thereby lessening the disturbance to the fluid stream by one before such fluid stream passes the other.

In a preferred form of the invention, the elements F and A each consist of a semi-conductor element having a negative temperature coefficient of resistance. Such elements are known in the art as "thermistors" and have the characteristic of decreasing resistance with increasing temperature. Such a characteristic is plotted in the form of a graph in Fig. 3.

Figure 2:
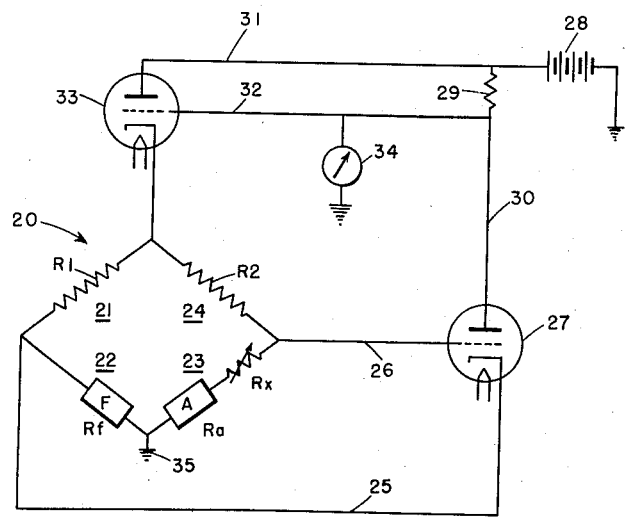
Fig. 2 is a schematic diagram of one type of circuit suitable for operating the apparatus shown in Fig. 1.

Referring now to Fig. 2, one type of circuit arrangement represented by the blocks 13 to 16 of Fig. 1 is illustrated. In Fig. 2, there is shown an electrical bridge 20 having first, second, third, and fourth arms designated 21, 22, 23, and 24 respectively, connected end to end to form a closed circuit. The thermistors F and A are connected in series respectively in the arms 22 and 23, while ordinary linear resistances R1 and R2 are connected in the arms 21 and 24 respectively.

In accordance with the invention, the resistance R2 has a value much greater than R1 the reason for which will become clear when the operation of the system is described. In accordance with a further feature of the invention, a high resistance $Rx$ may be included in the arm 23. As shown in Fig. 2 the common junction points of arms 21 and 22 and arms 23 and 24 of bridge 20 are connected through leads 25 and 26 respectively to the cathode and grid of a triode amplifying tube 27. Plate voltage is supplied to tube 27 by battery 28 through plate load resistance 29 and lead 30.

A feedback circuit from amplifier tube 27 to bridge 20 is effected by means of leads 31 and 32 connected across the resistance 29 to the plate and grid respectively of a cathode follower tube 33. A high impedance voltage indicator 34 may be connected between lead 32 and ground as shown. The cathode of tube 33 is connected to the common junction point of arms 21 and 24 of bridge 20; and the lower junction point of arms 22 and 23 is grounded at 35. Bridge network 20 thus constitutes the cathode resistance of the cathode follower tube 33.

The operation of the system of Figs. 1 and 2 is as follows:

Assume first that the fluid in conduits 10 and 12 is stationary and has an ambient temperature of 25° C. At this temperature "thermistor" A will have a certain resistance $Ra$ as determined from Fig. 3. Further assume for the moment that resistance $Rx$ is zero. Resistance R2 in bridge circuit 20 is given a high arbitrary value, say three times the value of $Ra$ at 25° C. It is contemplated that "thermistor" A will assume the ambient temperature and to this end it is important that it not be appreciably heated by current in bridge arm 23. It is for this reason that R2 is given a relatively high value.

"Thermistor" F will be used to indicate the flow rate and to this end it is heated by a large current in bridge arms 21 and 22 to a certain temperature greater than the ambient temperature of 25° C. This heating reduces the resistance of element F to a value of $Rf$. Resistance R1 in arm 21 is then determined to have a value sufficient to balance the bridge. The condition of balance— that is, no signal between the grid and cathode of amplifier tube 27—is attained when:

$$\frac{R1}{Rf} = \frac{R2}{Ra} \qquad (1)$$

where resistance $Rx$ is neglected for the moment. This equation determines R1. Thus, if R2 is three times $Ra$, then R1 should be three times the value of $Rf$ when heated to a temperature greater than 25° C. Since $Rf$ is considerably less than $Ra$, inasmuch as the heated "thermistor" F has less resistance than the "thermistor" A at 25° C., the total resistance of arms 21 and 22 of bridge 20 is much less than the total resistance of arms 23 and 24. Accordingly, any current flow through the bridge from cathode follower tube 33 to ground will be considerably less in arm 23 than in arm 22 and the condition that "thermistor" A not be heated by too much current is fulfilled.

With no fluid flow and resistances R1, R2 and "thermistors" F and A adjusted as outlined above, no signal will appear on the grid of tube 27. This tube will be passing a given current for zero grid volts which will cause a drop across plate resistance 29 and bias the grid of cathode follower tube 33 negatively with respect to its cathode but not sufficiently negatively to cut-off tube 33.

As tube 33 is not cut-off, a small current will be passing from battery 28 through tube 33 and the arms of the bridge network 20 to ground at 35. It is this cathode current which splits unevenly in arms 21 and 24 due to the different resistance values of R1 and R2 and maintains "thermistor" F heated while not appreciably heating "thermistor" A. As stated, under these steady state conditions the bridge is balanced and indicator 34 which measures the amplified form of the signal appearing on the grid and cathode of tube 27, can be calibrated to read zero indicating that no fluid is flowing.

Assume now that the fluid 11 begins to flow along conduit 12. The flow past "thermistor" F will immediately cool this "thermistor" by carrying the heat away therefrom. The amount of cooling will depend upon how fast the heat is carried away which in turn depends upon the rate of flow or speed at which the fluid passes over the "thermistor." Since "thermistor" A is already at the ambient temperature of fluid 11, the flow past it will have no effect.

Figure 3:
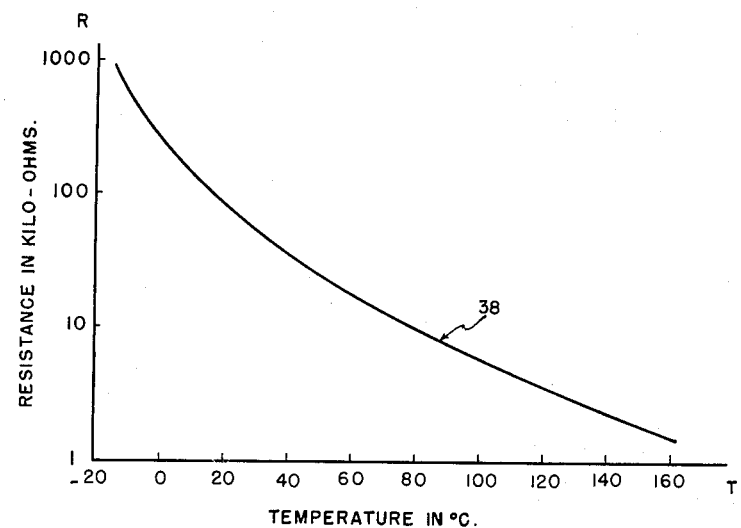
Fig. 3 is a graph of the temperature-resistance characteristics of the thermal elements of Fig. 1; and, Fig. 4 illustrates a second type of circuit suitable for operating the apparatus of Fig. 1.

"Thermistor" F, being cooled by a certain amount, will now have a much higher resistance than before as will be appreciated from the characteristic curve of Fig. 3. This higher resistance will unbalance bridge 20 giving rise to a positive signal communicated through lead 25 to the cathode of tube 27. A positive potential on the cathode renders the grid more negative relative to the cathode and accordingly, the current drawn by tube 27 will be decreased. This decrease will cause a diminished voltage drop across resistance 29 raising the potential on the grid of tube 33 to permit an increase in the current in tube 33 and subsequently through the bridge network 20. The increase in current will tend to reheat "thermistor" F and thus make up for the heat it is losing due to the fluid flow. The decreasing temperature of "thermistor" F due to this fluid flow is thus checked and the signal across the cathode and grid of tube 27 will not increase. Accordingly, the signal appearing on the grid of tube 33 will not increase and the heating current through the tube will remain at its new value.

Should the fluid flow rate decrease, "thermistor" F would not be cooled at the same rate and its temperature would rise thereby decreasing its resistance. This decrease of resistance will drop the potential on lead 25, effectively raising the grid potential of tube 27. More current will then be drawn by tube 27 decreasing the potential on the grid of tube 33 and thereby decreasing the current through 33 to the bridge. The heating of "thermistor" F due to the current will thus be less than before the fluid flow decreased.

It is seen, accordingly, that the circuit feedback arrangement will function in such a manner as to tend to keep "thermistor" F at a given raised temperature and thus keep bridge 20 in equilibrium. Since the degree of unbalance and thus the amplified signal appearing at the output of tube 27 is determined by the degree of change in the resistance Rf of "thermistor" F, which in turn depends on the flow rate of fluid 11, it is clear that the reading of voltage indicator 34 will be a direct function of such fluid flow.

In so far as the above description is concerned, the "thermistor" A might well have been replaced by a constant resistance of equal value. This fact is only true, however, because it was assumed that the ambient temperature of the fluid remained constant.

Clearly, if the ambient temperature of fluid 11 is changed, the rate at which heat is carried away from "thermistor" F would also change inasmuch as the temperature gradient between "thermistor" F and the surrounding fluid is not the same. Thus, "thermistor" F will be affected by both ambient temperature changes and fluid flow rate changes causing an error in the flow indicator. The ambient temperature "thermistor" A, however, will compensate for this error in the following manner:

Assume for the moment that a constant flow of fluid is passing along conduit 12 and that a certain voltage on meter 34 indicative of this flow is being measured. Suppose now that an increase in the fluid ambient temperature occurs. The resistance of "thermistor" A will immediately decrease causing less resistance to appear in arm 23 of the bridge. But at the same time, the increase in ambient temperature will diminish the rate at which thermistor F is being cooled thus preventing F from increasing in resistance to the value it would have if no increase in ambient temperature occurred. The resistance in arm 22 is, therefore, less than would be expected. Since the respective resistances of arms 22 and 23 are simultaneously decreased for an increase in ambient temperature and since these arms are on opposite sides of the bridge, the voltage difference appearing on leads 25 and 26 will not be appreciably different from the value it had before any change in ambient temperature occurred. The "thermistor" A will thus "track" the "thermistor" F over variations in ambient temperature in such a manner as to keep the signal appearing across the grid-cathode circuit of tube 27 relatively independent of ambient temperature changes and the voltage measured by indicator 34 will only reflect the changes in the resistance in "thermistor" F due to changes in flow rate.

It is important to bear in mind that the above process occurs substantially instantaneously because of the fact that the "thermistors" F and A are physically close together; that is, changes in the fluid ambient temperature will act on both "thermistors" at substantially the same time. It is to enable these "thermistors" to be located adjacent one another that the total resistance in arms 23 and 24 is made considerably greater than the total resistance in arms 21 and 22. If, for example, the total resistance in the respective arms were equal, both "thermistors" F and A would be heated the same amount as equal currents would flow in the bridge arms, and in order to effect correction for ambient temperature variations, "thermistor" A would have to be isolated from the fluid flow so as not to be cooled thereby. So isolating "thermistor" A would result in a slower response of the overall system to ambient temperature changes since the two "thermistors" F and A would not be affected simultaneously by such change due to their relatively great physical separation.

It is clear then, that by virtue of the above described arrangement, the fluid flow measuring apparatus will indicate fluid flow and fluid flow changes extremely rapidly and substantially independently of ambient temperature fluctuations. Moreover, because of the high amplification of the signal indicating bridge unbalance, a very small change in the fluid flow will be immediately detected. Thus, the response time to small variations in flow rate is extremely rapid. Further, the sensitivity of the measuring system is greatly increased with higher amplification.

A greater improvement in the overall system and in further decreasing the error due to ambient temperature changes, can be attained in accordance with the invention by means of a further resistance Rx inserted in series with "thermistor" A in the arm 23 of bridge 20. The effect of resistance Rx is two-fold: first, it will increase even further the total resistance of arms 23 and 24 thereby insuring that the current passing through "thermistor" A will be small and thus have the negligible heating effect; second, it will improve the "tracking" between the "thermistors" F and A during ambient temperature fluctuations. This latter improvement results from the fact that the negative temperature coefficient of resistance for the "thermistors" varies slightly for different temperatures.

Referring to the graph in Fig. 3, for example, there is shown a curve 38 which gives the resistance in kilo-ohms of either "thermistor" F or A (the "thermistors" being identical) at any temperature T in degrees centigrade. The equation of curve 38 is given approximately by:

$$R = ae^{\frac{+b}{T+273}} \quad (2)$$

where the constants $a$ and $b$ are determined by the particular material from which the "thermistor" is made and the particular units employed, and the expression $T+273$ converts the temperature to the Absolute scale.

For typical "thermistors" operable in the present invention, and for R given in kilo-ohms, $$a = 16.66 \times 10^{-5}$$
$$b = 3860$$

The negative temperature coefficient of resistance, is defined as follows:

$$\alpha = \frac{1}{R}\frac{dR}{dT} \quad (3)$$

From Equation 2, $$\frac{dR}{dT} = ae^{\frac{+b}{T+273}}\left[-\frac{b}{(T+273)^2}\right]$$

$$= -R\frac{b}{(T+273)^2}$$

and thus, $$\alpha = -\frac{b}{(T+273)^2} \quad (4)$$

It is seen accordingly that $\alpha$, the negative temperature coefficient of resistance, will change at different temperatures.

In order to improve the "tracking" of "thermistors" F and A, it would be desirable to have the coefficient of resistance $\alpha$ for "thermistor" F at its heated value—say 80° C., equal to the coefficient $\alpha$ for "thermistor" A at 25° C. Equal temperature changes in "thermistors" F and A will then result in equal percentage resistance changes.

Let $\alpha f$ = coefficient of "thermistor" F at 80° C.
Let $\alpha a$ = coefficient of "thermistor" A at 25° C.
Let $\alpha m$ = coefficient of arm 23 including Ra and Rx.

The additional resistance Rx in arm 23 will give the coefficient of resistance $\alpha m$ of the whole arm (from Equation 3) the following value:

$$\alpha m = \frac{1}{(Ra+Rx)}\frac{d(Ra+Rx)}{dT}$$

where $Rx$ is a constant. Performing the differentiation yields:

$$\alpha m = \frac{Ra}{(Ra+Rx)}\left[-\frac{b}{(T+273)^2}\right]$$

or since $\alpha a$, the coefficient of "thermistor" A alone, is given by:

$$-\frac{b}{(T+273)^2}$$

then:

$$\alpha m = \frac{Ra}{Ra+Rx}\alpha a$$

The resistance $Rx$ will be given such a value that the total coefficient $\alpha m$ will be equal to the coefficient $\alpha f$ of "thermistor" F at its heated value.

From Equation 4, the value of $\alpha$ at 80° C. given by $\alpha f$ is:

$$\alpha f = \frac{-b}{(T+273)^2} = \frac{-3860}{(80+273)^2} = -.0310$$

and the value of $\alpha$ at 25° C. given by $\alpha a$ is:

$$\alpha a = \frac{-b}{(T+273)^2} = \frac{-3860}{(25+273)^2} = -.0435$$

Hence, for $\alpha f = \alpha m$ $$.0310 = \frac{Ra}{Ra+Rx}.0435$$

From curve 38, $Ra$ at 25° C. equals $70k$, therefore, $$.0310 = \frac{70}{70+Rx}.0435$$

from which $Rx$ will have a value of about $28k$.

It is clear then, that by adding resistance $Rx$ to the arm 23, errors introduced by ambient temperature changes are further reduced. Moreover, this resistance will additionally decrease any heating effect due to current through "thermistor" A. It will be noted that resistance $Rx$ is made variable as indicated by the arrow in the drawing. Thus, if calculations of the value of $Rx$ were made under different operating conditions where the ambient temperature was different from 25° C. and the raised temperature of "thermistor" F was different from 80° C., the resistance of $Rx$ could be varied to equal its new calculated value. This new value will not be appreciably different from the old value because of the small variance of the slopes at different temperatures on the characteristic curve 38; but nevertheless, by so adjusting $Rx$ best optimum results under any one set of contemplated operating conditions can be realized. Of course, the addition of resistance $Rx$ means that resistance R2 should be given a higher value to maintain the bridge balance in accordance with Equation 1.

Figure 4:
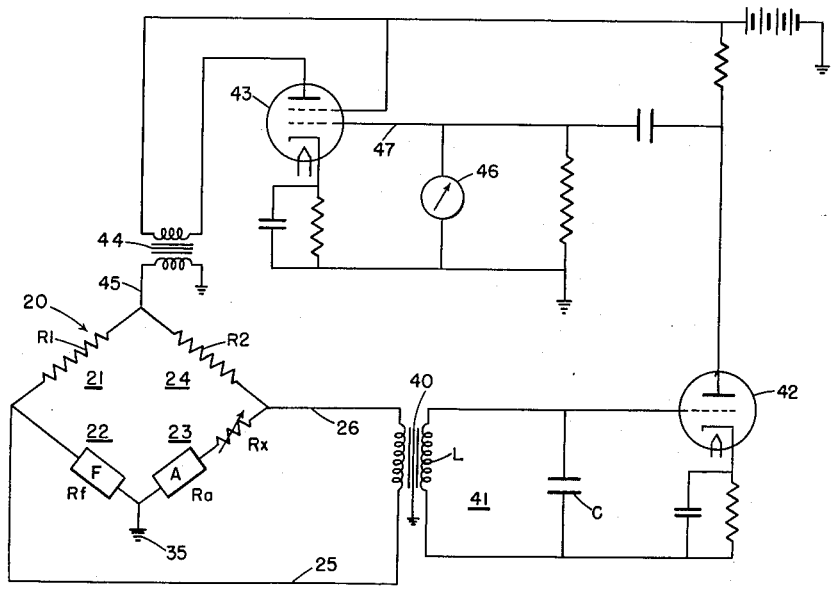

Fig. 4 illustrates a modification of the circuit shown in Fig. 2 utilizing an A.-C. circuit for heating thermistor F and obtaining indications of bridge unbalance. The same reference numerals used in Fig. 2 identify corresponding elements in Fig. 4.

In this embodiment, the signal indicating unbalance of bridge 20 is fed through leads 25 and 26 to the primary winding of a transformer 40. The secondary coil winding designated by the letter L forms with shunting capacitor C a resonant circuit 41 tuned to a carrier signal of frequency very high compared to any fluctuation frequency due to changes in fluid flow. The envelope or changes in amplitude of this carrier frequency is amplified through the amplifying tube 42, resistance-capacitance coupled power amplifier tube 43, and coupling transformer 44, connected to the output of tube 43. It is then fed through lead 45 to the bridge 20 at the junction of resistances R1 and R2. A voltage indicator 46 may be connected between the control grid lead 47 of the tube 43 and ground as shown.

In operation, assume bridge 20 to be initially in balance. An alternating current signal of high frequency determined by resonant circuit 41 will be flowing from the output of the amplifier through lead 45 and bridge 20 to ground. This current, in the same manner as the current in Fig. 2, will split unevenly in arms 21 and 24 of bridge 20 and maintain "thermistor" F at a raised temperature. This steady state high frequency oscillation will continue due to the feed-back arrangement, and a certain voltage on indicator 46 proportional to the amplitude of the envelope of the carrier signal can be measured.

Assuming now that the fluid flow rate increases, a signal will appear between leads 25 and 26 as explained in connection with Fig. 2. This signal will enhance the oscillations in resonant circuit 41 and thus the signal envelope which increase in intensity will be greatly amplified through tubes 42 and 43 and fed back along lead 45 to the bridge causing a corresponding increase in current flow therethrough. As in the case of the embodiment of Fig. 2, this increase will reheat "thermistor" F and thus tend to decrease the signal input to resonant circuit 41 thereby limiting the amplitude of the oscillations to a certain value. Voltage indicator 46 will yield a reading proportional to the oscillation amplitude and thus to the rate of fluid flow. A decrease in fluid flow will have the effect of lowering the amplitude of oscillations through the circuit feedback arrangement in the same manner.

Various modifications of the present apparatus will occur to those skilled in the art. Thus, for example, while only two types of amplifier feedback arrangements have been illustrated, any suitable amplifier and feedback system may be utilized, and any number of amplifying stages consistent with the accuracy of the final readings desired may be employed. Moreover, the voltage indicator may be a cathode ray oscilloscope to enable extremely rapid fluctuations in fluid flow to be observed. Alternatively, a recording galvanometer may be used. Further, while "thermistor" type thermal elements have been illustrated, it is clearly within the spirit of the invention to utilize other thermal elements in which the resistance varies either directly or inversely with changes in temperature. Preferably such elements should be operable in liquid fluids. Of course, if positive temperature coefficient of resistance thermal elements are used, leads 25 and 26 should be interchanged in the specific system of Fig. 2 to insure that the feedback signal is of such a polarity as to prevent oscillations.

Other modifications can also be effected. For example, the "thermistor" A might be constructed of a different material from the "thermistor" F such that "thermistor" A's temperature coefficient of resistance at one temperature is the same as that of "thermistor" F at another.

The apparatus disclosed in this invention is accordingly not to be thought of as limited to the particular embodiments illustrated.

I claim:

1. An apparatus for measuring the flow of fluid past a given point, comprising, in combination: first and second thermally responsive elements disposed in the fluid at said point, each of said elements having an electrical resistance which varies with its temperature, the temperature of said first element being responsive to the flow rate and ambient temperature of said fluid and the temperature of said second element being responsive to the ambient temperature of said fluid; a bridge network comprising first, second, third, and fourth arms connected end to end to form a closed circuit, said first and second thermally responsive elements being connected in said second and third arms of the bridge respectively; a first resistance connected in said first arm; a second resistance connected in said fourth arm, said second resistance being greater than said first resistance whereby the total resistance of said fourth and third arms in series is greater than the total resistance of said first and second arms in series; means supplying electric current for energizing said bridge network connected to the common junction point of said first and fourth arms and to the common junction point of said second and third arms, a greater part of said current passing through the first and second arms to heat said first thermally responsive element to a raised temperature greater than the ambient temperature of said fluid, and the remaining part of said current passing through the fourth and third arms; amplifier means having an input and output, said input being connected between the common junction point of said first and second arms and the common junction point of said third and fourth arms; feedback means connected between the output of said amplifier means and said means supplying electric current for controlling the magnitude of said current in accordance with the output of said amplifier means, whereby a change in the flow rate of said fluid will be reflected by a change in the resistance of said first thermal element to unbalance said bridge and operate said amplifier means to pass a signal to said feedback means for varying the magnitude of said current in a direction to rebalance said bridge; a variable resistance in series with said second thermally responsive element in said third arm, said resistance having a value such that the total temperature coefficient of resistance of said third arm when said second thermally responsive element is at the ambient temperature of said fluid is substantially equal to the temperature coefficient of resistance of said first thermally responsive element when said element is at its raised temperature, so that changes in the fluid ambient temperature result in substantially equal percentage resistance changes in each of said thermally responsive elements to maintain said bridge in balance during such ambient temperature changes; and indicating means responsive to said signal from said amplifier means to said feedback means, to indicate a quantity proportional to the rate of flow of said fluid.

2. An apparatus according to claim 1, in which said means supplying electric current comprises a cathode follower tube, said feedback means comprising a pair of conductors connecting the output of said amplifier means across the grid and plate of said cathode follower tube, and the cathode of said tube being connected to the common junction point of said first and fourth arms, the common junction point of said second and third arms being grounded.

3. An apparatus according to claim 1, in which said amplifier means comprises an alternating current amplifier including a high frequency oscillating circuit in its input whereby unbalancing of said bridge changes said high frequency current, said signal to said feedback means being proportional to said changes for controlling said means supplying electric current.

References Cited in the file of this patent

UNITED STATES PATENTS

| | | |
|---|---|---|
| 1,691,600 | Brush, Jr. et al. | Nov. 13, 1928 |
| 2,437,449 | Ames, Jr. et al. | Mar. 9, 1948 |
| 2,552,017 | Schwartz et al. | May 8, 1951 |
| 2,580,182 | Morgan et al. | Dec. 25, 1951 |
| 2,650,496 | Middleton et al. | Sept. 1, 1953 |